United States Patent
Momchilov

(10) Patent No.: US 11,159,531 B2
(45) Date of Patent: Oct. 26, 2021

(54) COMPUTER SYSTEM PROVIDING ANONYMOUS REMOTE ACCESS TO SHARED COMPUTING SESSIONS AND RELATED METHODS

(71) Applicant: CITRIX SYSTEMS, INC., Fort Lauderdale, FL (US)

(72) Inventor: Georgy Momchilov, Parkland, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 313 days.

(21) Appl. No.: 16/264,802

(22) Filed: Feb. 1, 2019

(65) Prior Publication Data

US 2020/0252402 A1 Aug. 6, 2020

(51) Int. Cl.
H04L 29/06 (2006.01)
H04L 29/08 (2006.01)

(52) U.S. Cl.
CPC ............ *H04L 63/10* (2013.01); *H04L 63/20* (2013.01); *H04L 67/14* (2013.01)

(58) Field of Classification Search
CPC ... H04L 63/0884; H04L 43/065; H04L 43/04; H04L 63/10; H04L 63/20; H04L 67/14; H04L 63/105; H04L 63/104; H04L 65/1069; H04L 67/141; H04L 67/145; H04W 12/37; G06F 9/45558; G06F 9/452; G06F 2009/45587; G06F 21/6236; G06F 21/44; G06F 21/305

See application file for complete search history.

(56) References Cited

U.S. PATENT DOCUMENTS

| | | | |
|---|---|---|---|
| 9,176,744 B2 | 11/2015 | Lee | |
| 9,246,944 B1 | 1/2016 | Chen | |
| 9,538,345 B2 | 1/2017 | Sah et al. | |
| 9,942,240 B2 | 4/2018 | Hayton et al. | |
| 2004/0143669 A1* | 7/2004 | Zhao | H04L 29/06 709/228 |
| 2006/0048212 A1* | 3/2006 | Tsuruoka | H04L 9/0866 726/4 |
| 2011/0055913 A1 | 3/2011 | Wong | |
| 2011/0106885 A1* | 5/2011 | Davi | H04L 67/14 709/204 |
| 2011/0307615 A1 | 12/2011 | Krishnaswamy | |
| 2012/0291087 A1 | 11/2012 | Agrawal | |
| 2014/0280492 A1* | 9/2014 | Yang | A63F 13/00 709/203 |

(Continued)

*Primary Examiner* — Abu S Sholeman
(74) *Attorney, Agent, or Firm* — Allen, Dyer, Doppelt + Gilchrist, P.A.

(57) ABSTRACT

A computing system may include a server configured to provide access to shared application sessions, a first group of client computing devices configured to remotely access shared application sessions from the server through a secure interface using a client security credential, and a second group of client computing devices configured to remotely access shared application sessions from the server through a secure interface anonymously without a client security credential. The server may further provide access to the shared application sessions for the first group of client computing devices based upon a first access policy, and provide access to the shared application sessions for the second group of client computing devices based upon a second access policy different than the first access policy.

20 Claims, 7 Drawing Sheets

(56) References Cited

U.S. PATENT DOCUMENTS

| | | | |
|---|---|---|---|
| 2014/0359735 A1* | 12/2014 | Lehmann | H04L 63/0884 |
| | | | 726/7 |
| 2015/0081401 A1* | 3/2015 | Smith | G06Q 10/06 |
| | | | 705/12 |
| 2015/0205593 A1* | 7/2015 | Yokota | G06F 8/61 |
| | | | 717/174 |
| 2016/0277387 A1 | 9/2016 | DeWeese et al. | |
| 2016/0366134 A1* | 12/2016 | Hughes | H04W 4/24 |
| 2017/0339564 A1 | 11/2017 | Momchilov et al. | |
| 2018/0191731 A1 | 7/2018 | Hayton et al. | |
| 2019/0141092 A1* | 5/2019 | Sanchez | H04L 65/1073 |

* cited by examiner

COMPUTER SYSTEM PROVIDING ANONYMOUS REMOTE ACCESS TO SHARED COMPUTING SESSIONS AND RELATED METHODS

BACKGROUND

Traditionally, personal computers include combinations of operating systems, applications, and user settings, which are each managed individually by owners or administrators on an ongoing basis. However, many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server(s) may include one or more hypervisors (virtual machine managers) to create and maintain multiple virtual machines, software to manage the hypervisor(s), a connection broker, and software to provision and manage the virtual desktops. In some embodiments, a VDI server(s) may provide access to shared server-based hosted applications, as well as Web/Software-as-a-Service (SaaS) applications.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, and/or provide access to shared applications, along with additional computing devices to provide management and customer portals for the cloud system.

SUMMARY

A computing system may include a server configured to provide access to shared application sessions, a first group of client computing devices configured to remotely access shared application sessions from the server through a secure interface using a client security credential, and a second group of client computing devices configured to remotely access shared application sessions from the server through a secure interface anonymously without a client security credential. The server may further provide access to the shared application sessions for the first group of client computing devices based upon a first access policy, and provide access to the shared application sessions for the second group of client computing devices based upon a second access policy different than the first access policy.

In one example implementation, the server may provide access to the shared application sessions based upon a session license quota, and the server may further count shared application session access by the first and second groups of client computing devices towards the session license quota. Furthermore, the second access policy may correspond to a reduced feature set for the shared application sessions compared to the first access policy, for example. Also by way of example, the first and second access policies may comprise different data loss prevention (DLP) policies.

In accordance with another example, the first and second access policies may comprise different telemetry data collection policies. The server may also be configured to permit access by the second group of client computing devices to the shared application sessions based upon an enterprise credential. More particularly, the enterprise credential may comprise one or more of a customer identifier (ID), organizational uniform resource locator (URL), and a temporary code.

In an example implementation, the secure interface may comprise an embedded browser on at least one of the first and second client computing devices. In still another example, the shared application sessions may comprise Software as a Service (SaaS) application sessions. Additionally, the server may provide access to the shared application sessions for the second group of client computing devices based upon at least one of an organization identifier (ID), customer ID, and user category.

A related method may include providing access to shared application sessions at a server, and remotely accessing shared application sessions from the server from a first group of client computing devices through a secure interface using a client security credential, with the server providing access to the shared application sessions for the first group of client computing devices based upon a first access policy. The method may further include remotely accessing shared application sessions from the server from a second group of client computing devices through a secure interface anonymously without a client security credential, with the server providing access to the shared application sessions for the second group of client computing devices based upon a second access policy different than the first access policy.

A related non-transitory computer-readable medium may have computer-executable instructions for causing a server to perform steps including providing remote access to shared application sessions by a first group of client computing devices through a secure interface using a client security credential based upon a first access policy, and providing remote access to shared application sessions by a second group of client computing devices through a secure interface anonymously without a client security credential. Remote access by the second group of client computing devices may be based upon a second access policy different than the first access policy.

DETAILED DESCRIPTION

Generally speaking, the system and methods described herein relate to an approach for providing remotes access to shared application sessions by client computing device, such as Software as a Service (SaaS) applications and/or native applications provided through a virtual desktop interface (VDI) infrastructure. More particularly, the computing system and methods set forth herein allow for both credentialed and non-credentialed access to shared application sessions with corresponding access policies, thereby providing an improved virtual computing environment through enhanced access to virtualized computing resources, tracking of application session licenses, and implementation of appropriate security and permission levels for different groups of client computing devices.

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
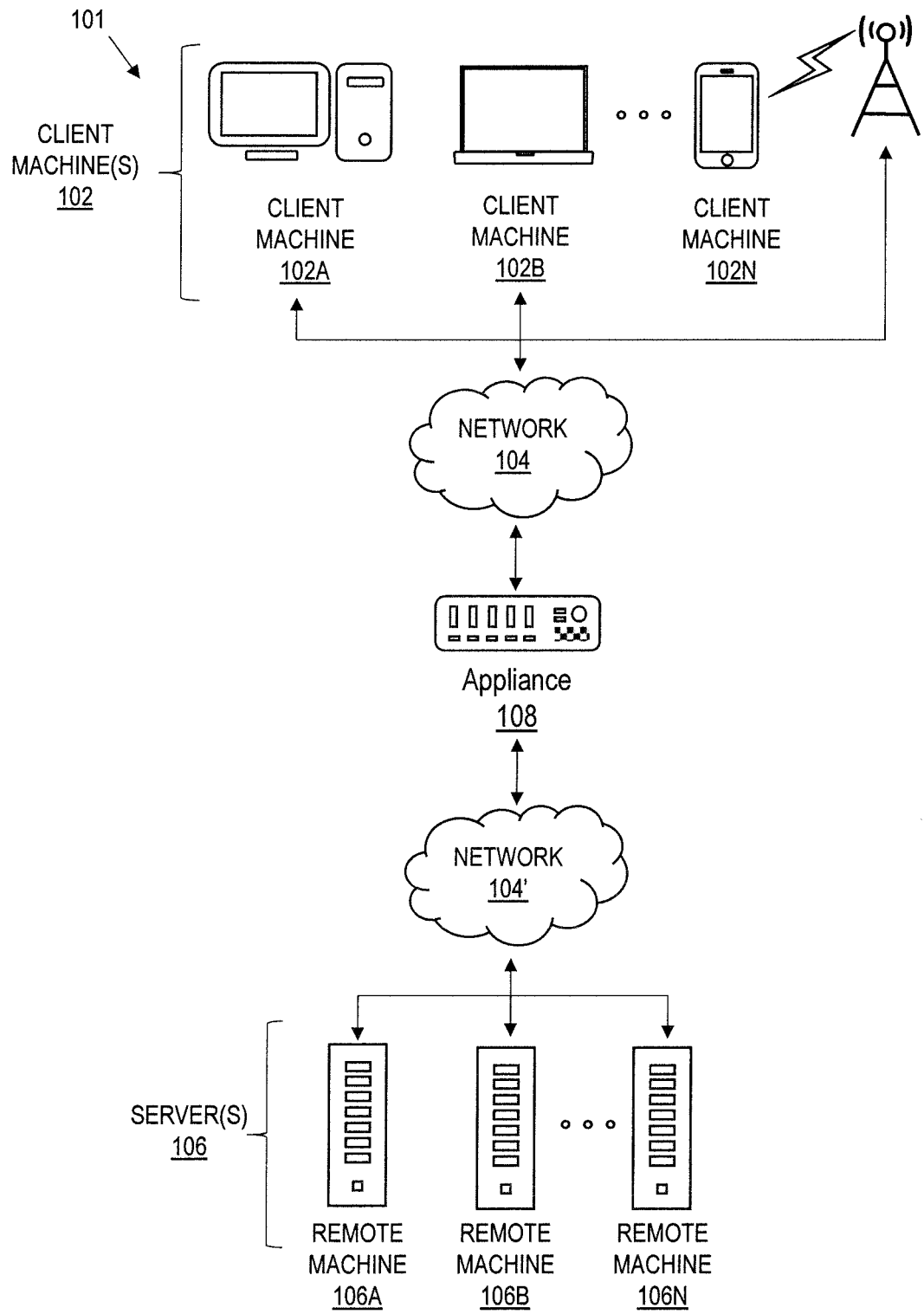
FIG. 1 is a schematic block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
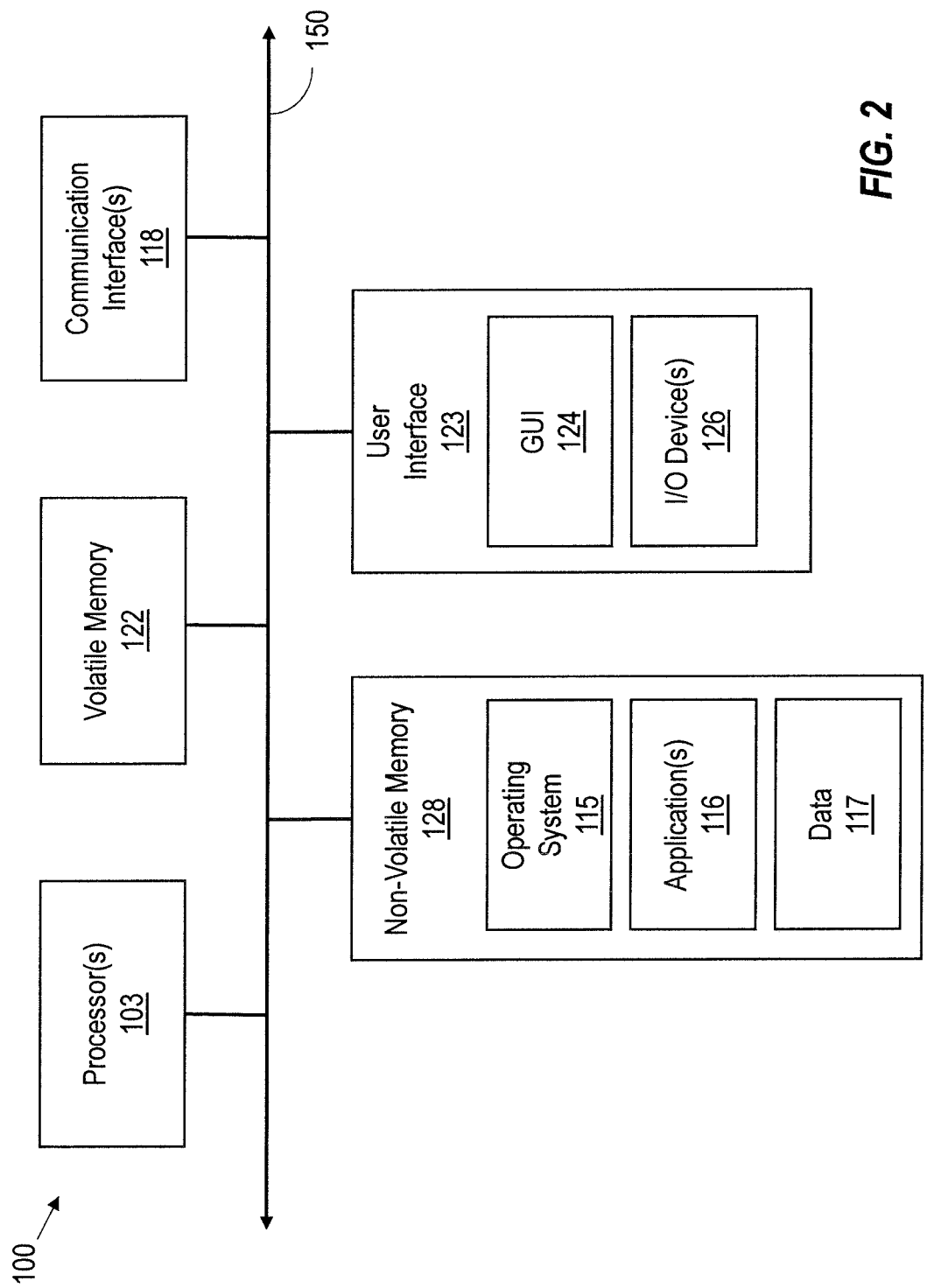
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
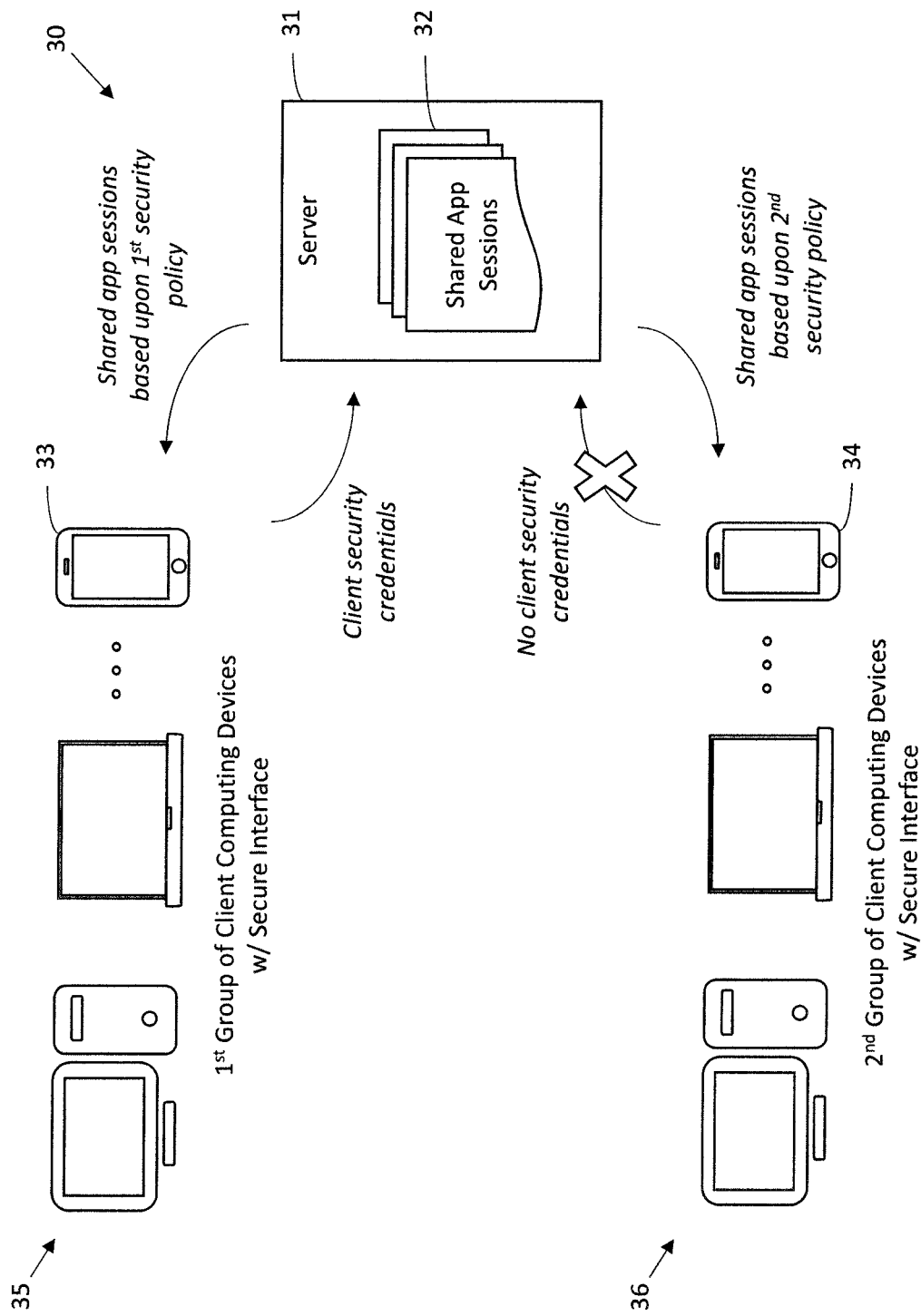
FIG. 3 is a schematic block diagram of a computing system in accordance with an example embodiment providing both credentialed and anonymous remote access to shared application sessions and related methods.

Turning now to FIG. 3, a computer system 30 and associated method aspects are first described. The computing system illustratively includes a server 31 configured to provide access to shared application sessions 32. By way of example, the computer system 30 may be implemented as a unified endpoint management (UEM) system in which the server 31 allows for centralized control of client computing devices 33, 34, which are respectively organized in two different groups 35, 36, as will be discussed further below. It should be noted that other configurations of the computer system 30 are also possible, such as an enterprise mobility management (EMM) configuration, for example. In accordance with one example implementation, the server 31 may be implemented as part of a Citrix Workspace implementation in combination with Citrix Netscaler Secure Web Gateway to provide shared application access as discussed further below, but it will be appreciated that other systems and platforms may be used in different embodiments.

In such implementations, the server 31 allows for the enforcement of data loss prevention (DLP) and/or other security policies for user access to various applications and data, and in some instances may be implemented in conjunction with a mobile device management (MDM) agent installed on the client computing devices 33 and/or 34. Also, the computer system 30 may utilize a mobile application management (MAM) approach, which provides enterprise control at the application level for managing and securing application data without installing an agent on the client computing devices 33 and/or 34.

By way of example, the client computing devices 33, 34 may be desktop computers, laptop computers, tablet computers, smartphones, etc. The first group 35 of client computing devices 33 are configured to remotely access the shared application sessions 32 from the server 31 through a secure interface (e.g., an embedded browser, etc.) using a client security credential. More particularly, the client/user security credential may include a user ID/password or client computing device ID, for example. On the other hand, the second group 36 of client computing devices 34 is configured to remotely access the shared application sessions 32 from the server 31 also through a secure interface, but anonymously without a client security credential. As such, the server 31 may provide access to the shared application sessions 32 for the first group 35 of client computing devices 33 based upon a first access policy, and provide access to the shared application sessions for the second group 36 of client computing devices 34 based upon a second access policy different than the first access policy.

The server 31 may accordingly provide a limited computing environment in terms of available features or security access for anonymous users/test users (e.g., the client computing devices 34 in the second group 36), while providing a full-featured environment to the client computing devices 33 of the first group 35 in terms of security access and/or available application features. In accordance with one example embodiment, an embedded browser within the Citrix Workspace App (CWA) may allow security and/or feature set policies to be applied to the second group 36 of client computing devices 34 based on broad categories as opposed to a specific user ID, device ID, or other specific user credentials used by the client computing devices 33 in the first group 35. These policies may apply to shared application sessions such as Software as a Service (SaaS) apps, Web apps, native apps in a VDI infrastructure (e.g., Citrix HDX apps), etc., although other platforms and applications may be used in different embodiments. Moreover, this approach may also be used with a file sharing application/service, such as ShareFile, etc.

Figure 4:
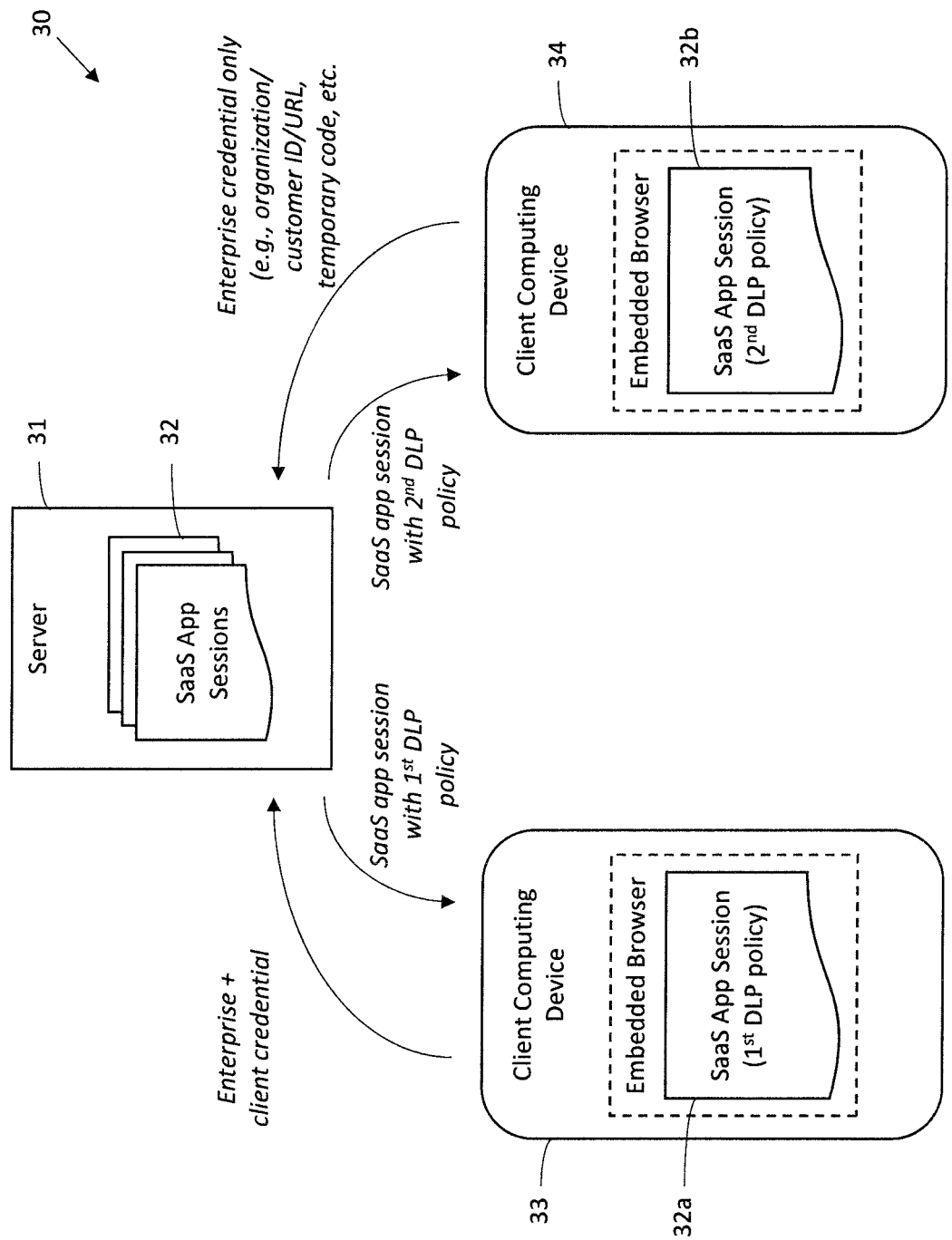
FIG. 4 is a schematic block diagram of the system of FIG. 3 in accordance with another example embodiment in which shared application session access is provided based upon enterprise credentials with different data loss prevention (DLP) policies.

In accordance with an example implementation now described with reference to FIG. 4, client computing devices 34 of the second group 36 may enroll anonymously with the server 31 based solely upon an enterprise credential, such as an organization or customer ID/URL, temporary code, etc. For example, a corporation or other enterprise (government entity, etc.) may utilize a cloud-based SaaS application from a provider that it not only wants to make available to employees, but also to non-employees. The employees, accessing the server 31 providing the SaaS application sessions 32, logs in based upon not only an enterprise credential (i.e., a customer ID/URL associated with the corporation and the user's respective ID/password) and receive access to a SaaS application session 32a in accordance with a first DLP policy, which provides employee level access to sensitive corporate information, for example.

However, a non-employee or customer of the corporation is also permitted access to a SaaS application session 32b which is based upon a second DLP policy different than the first DLP policy, which in this case is a more restrictive policy preventing access to the sensitive corporation data. For example, the client computing device 34 may visit a website for the company and access the SaaS application session 32b through that website, which in turn allows the SaaS application provider to determine that the session is being provided to an anonymous user via the corporate URL. In this way, the SaaS application provider is advantageously able to track how many licensed SaaS application sessions are being used by the corporation, including both employee and non-employee sessions, as will be discussed further below.

Figure 5:
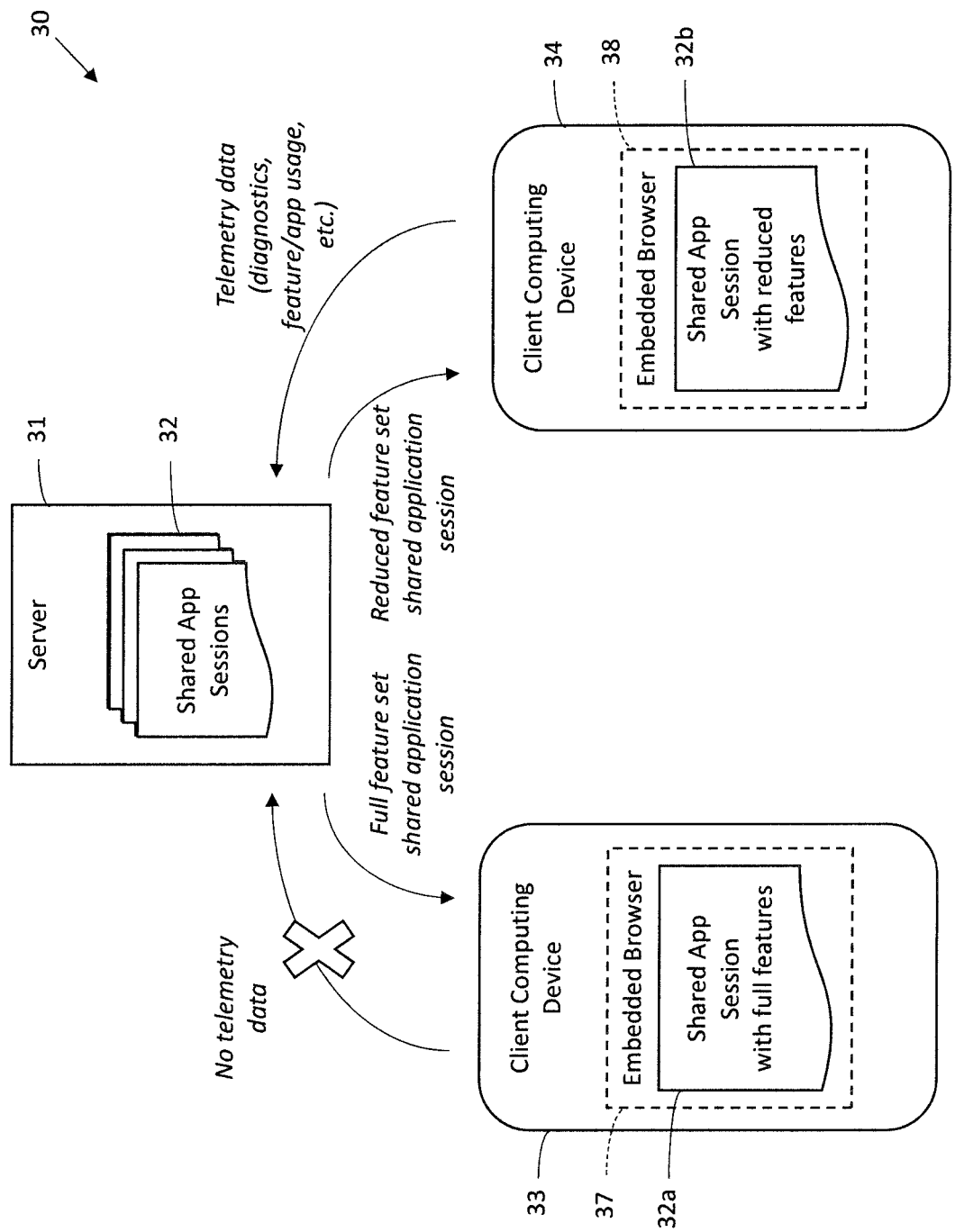
FIG. 5 is a schematic block diagram of the system of FIG. 3 in an example embodiment providing for selective telemetry collection and different application feature set levels corresponding to different access policies for different client computing devices.

Referring additionally to FIG. 5, in another example embodiment the client computing devices 33 in the first group 35 may receive a full or higher feature set for the application session 32a (and/or more security privileges), whereas the client computing devices 34 in the second group 36 may receive the application session 32b with a reduced or lower feature set (and/or less security privileges). By way of example, a bank may provide a mortgage calculator app or a business loan calculator app to its employees. It may also provide the same apps anonymously to its customers, who may use them without having an internal bank login account and without losing privacy. The EMM/UEM provider may still advantageously track license usage in its cloud for both the employees and customers as combined users. In the example of Citrix Workspace app, policies may advantageously be applied based upon broad categories of user, independent of user identity, if desired. Again, different platforms besides Citrix Workspace may also be used in different implementations.

Furthermore, in the illustrated example the server 31 does not collect telemetry data from the client computing devices 33 of the first group 35, but collects telemetry data from the client computing devices 34 of the second group 36. That is, the server 31 allows the users of the client computing devices 34 in the second group 36 to be anonymous with respect to their user/client identities, while keeping track of their usage habits based upon broad categories of user, independent of user identity, thus maintaining their privacy. Such telemetry may include diagnostic data, how the shared application sessions 32 (or certain features thereof) are used, etc. In this example, both of the client computing devices 33, 34 access the application sessions 32a, 32b via respective embedded browsers 37, 38. As will be appreciated by those skilled in the art, an embedded browser may be used to collect certain telemetry data based upon user input, HTTP requests, etc. In yet other embodiments, the server 31 may also collect telemetry data from the client computing devices 33 of the first group 35, while however keeping track of the explicit user identity, e.g. an employee of the corporation. In yet other embodiments, the server 31 may not collect any telemetry data from the client computing devices 34 of the second group 36.

In other example implementations, the differences between the first group 35 and second group 36 may be other than employee/non-employee. For example, the different groups 35, 36 may pertain to different categories of users, e.g., platinum level, gold level, silver level, etc., each of which gets different respective access to different app features or security settings, for example. Other differences between the first and second groups 35, 36 may pertain to user standing (e.g., whether a user or customer is in good standing or not), geographical location, etc.

Figure 6:
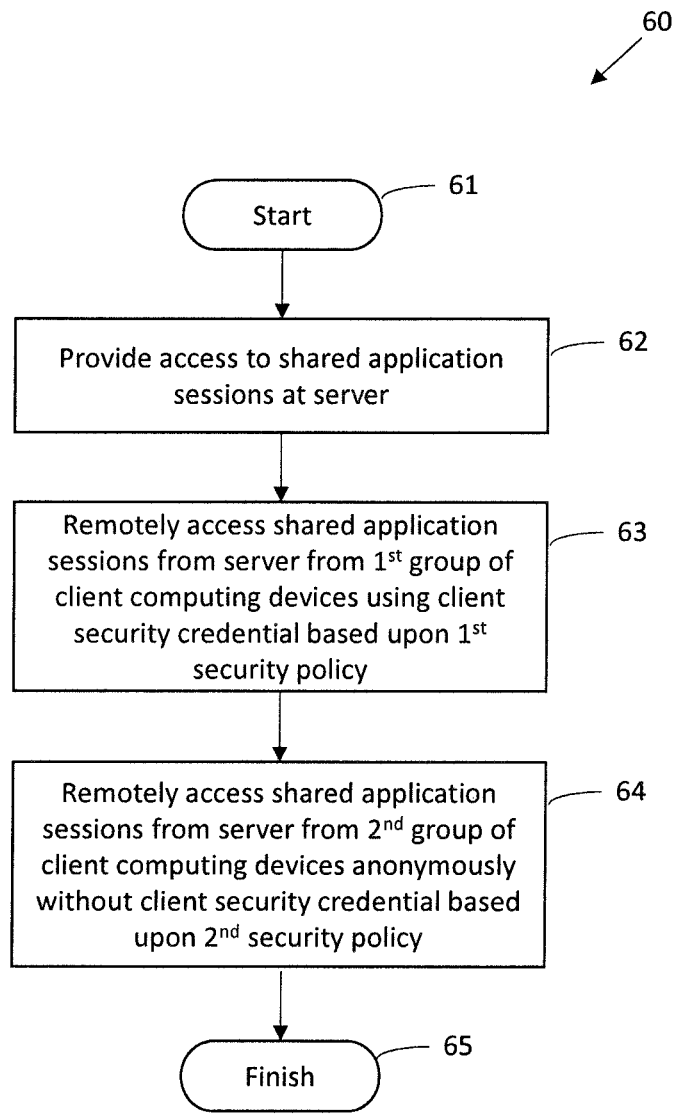
FIGS. 6 and 7 are flow diagrams illustrating example method aspects associated with the system of FIG. 3.

Turning now to the flow diagram 60 of FIG. 6, a related method is now described. Beginning at Block 61, the server 31 provides access to shared application sessions 32 as described above (Block 62). Furthermore, the client computing devices 33 of the first group 35 remotely access the shared application sessions 32 from the server 31 through a secure interface using a client security credential, with the server providing access to the shared application sessions for the first group of client computing devices based upon a first access policy, at Block 63. Moreover, the client computing devices 34 of the second group 36 remotely access the shared application sessions 32 from the server 31 through a secure interface anonymously without a client security credential, with the server providing access to the shared application sessions for the second group of client computing devices based upon a second access policy different than the first access policy (Block 64), as discussed further above. The method of FIG. 6 illustratively concludes at Block 65.

Figure 7:
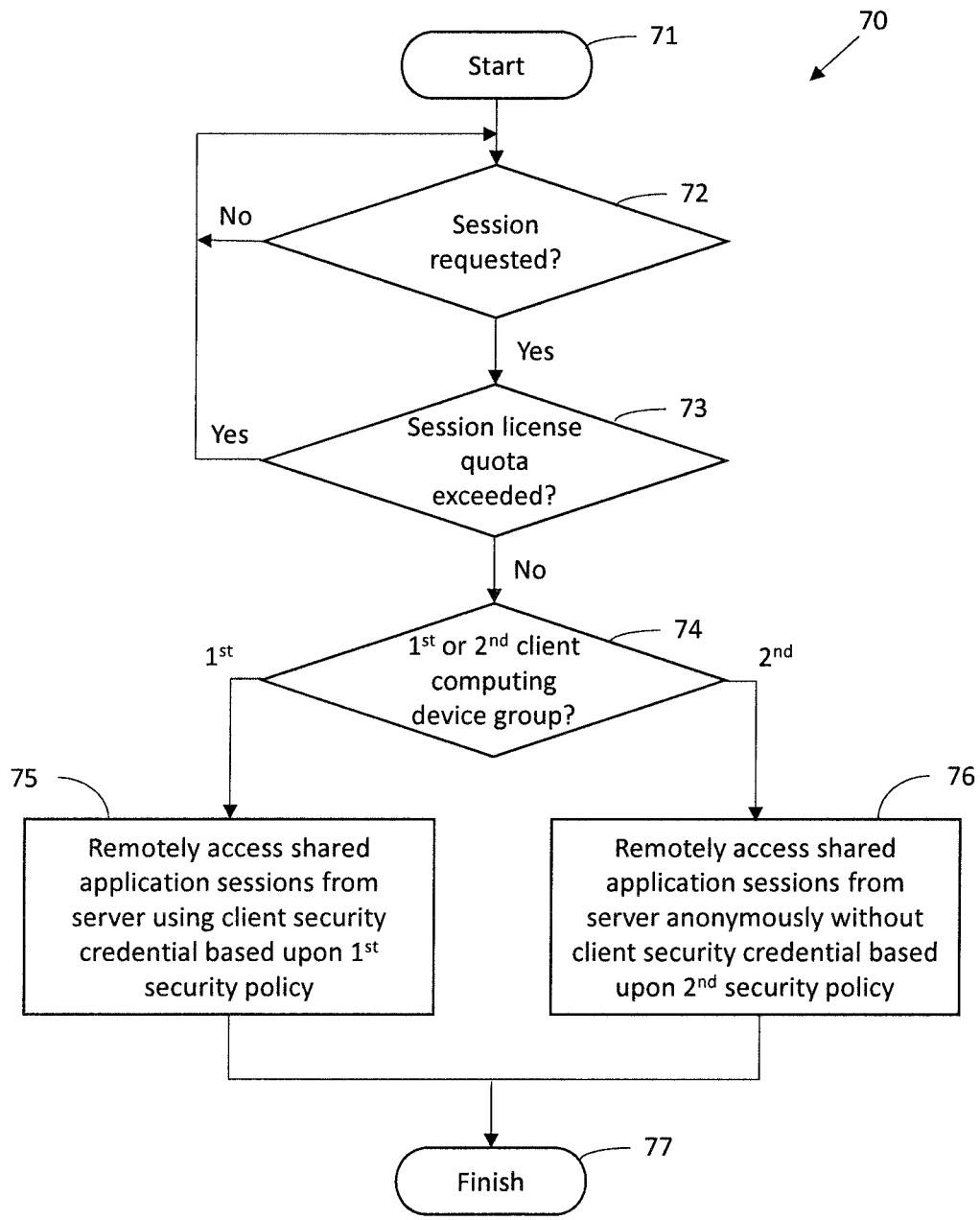

Referring additionally to the flow diagram 70 of FIG. 7, beginning at Block 71, when a shared application session is requested by one of the client computing devices 33 or 34, at Block 72, the server 31 may first determine whether a session license quota for the particular customer or enterprise has been exceeded, at Block 73. More particularly, a given enterprise may have access to a particular number of SaaS (or other) application sessions available for its users. When that number of sessions are all in use, in some implementations the license arrangement may not permit additional sessions to be provided to users of that enterprise until some sessions are closed so that the total quota of available licenses is not exceeded. If shared application sessions 32 are available, then the server may further determine whether the client computing device 33 or 34 requesting the session is from the first group 35 or the second group 36, at Block 74. As discussed above, if it is a client computing device 33 from the first group 35, then a shared application session 32 is provided in accordance with the first access policy (e.g., full feature set, enhanced security privileges, etc.), at Block 75. On the other hand, if the client computing device 34 is from the second group 36, then the shared application session is provided based upon the second access policy (e.g., reduced feature set, more restrictive security, etc.), although in an anonymous fashion.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing device comprising:
    a memory and a processor cooperating with the memory and configured to
        provide access to shared application sessions by a first group of client computing devices using a client security credential for authentication, and by a second group of client computing devices anonymously without a client security credential for authentication;
        wherein the processor provides access to the shared application sessions for the first group of client computing devices upon authentication based upon a first access policy, and provides access to the shared application sessions for the second group of client computing devices without authentication and based upon a second access policy different than the first access policy.

2. The computing device of claim 1 wherein the processor provides access to the shared application sessions based upon a session license quota; and wherein the processor further counts shared application session access by the first and second groups of client computing devices towards the session license quota.

3. The computing device of claim 1 wherein the second access policy corresponds to a reduced feature set for the shared application sessions compared to the first access policy.

4. The computing device of claim 1 wherein the first and second access policies comprise different data loss prevention (DLP) policies.

5. The computing device of claim 1 wherein the first and second access policies comprises different telemetry data collection policies.

6. The computing device of claim 1 wherein the server is configured to permit access by the second group of client computing devices to the shared application sessions based upon an enterprise credential.

7. The computing device of claim 6 wherein the enterprise credential comprises at least one of a customer identifier (ID), organizational uniform resource locator (URL), and a temporary code.

8. The computing device of claim 1 wherein the first group of client computing devices remotely accesses the shared application session via an embedded browser.

9. The computing device of claim 1 wherein the shared application sessions comprise Software as a Service (SaaS) application sessions.

10. The computing device of claim 1 wherein the processor provides access to the shared application sessions for the second group of client computing devices based upon at least one of an organization identifier (ID), customer ID, and user category.

11. A method comprising:
    using a server to provide access to shared application sessions by a first group of client computing devices using a client security credential for authentication, the server providing access to the shared application sessions for the first group of client computing devices based upon a first access policy; and
    using the server to provide access to shared application sessions by a second group of client computing devices anonymously without a client security credential for authentication, the server providing access to the shared application sessions for the second group of client computing devices without authentication and based upon a second access policy different than the first access policy.

12. The method of claim 11 wherein the server provides access to the shared application sessions based upon a session license quota; and further comprising, at the server, counting shared application session access by the first and second groups of client computing devices towards the session license quota.

13. The method of claim 11 wherein the second access policy corresponds to a reduced feature set for the shared application sessions compared to the first access policy.

14. The method of claim 11 wherein the first and second access policies comprise different data loss prevention (DLP) policies.

15. The method of claim 11 wherein the first and second access policies comprises different telemetry data collection policies.

16. A non-transitory computer-readable medium having computer-executable instructions for causing a server to perform steps comprising:
    providing remote access to shared application sessions by a first group of client computing devices upon authentication using a client security credential based upon a first access policy; and
    providing remote access to shared application sessions by a second group of client computing devices anonymously without a client security credential for authentication based upon a second access policy different than the first access policy.

17. The non-transitory computer-readable medium of claim 16 wherein the server provides access to the shared application sessions based upon a session license quota; and further having computer-executable instructions for causing the server to count shared application session access by the first and second groups of client computing devices towards the session license quota.

18. The non-transitory computer-readable medium of claim 16 wherein the second access policy corresponds to a reduced feature set for the shared application sessions compared to the first access policy.

19. The non-transitory computer-readable medium of claim 16 wherein the first and second access policies comprise different data loss prevention (DLP) policies.

20. The non-transitory computer-readable medium of claim 16 wherein the first and second access policies comprises different telemetry data collection policies.

* * * * *